US009108709B2

(12) United States Patent
Strzempko

(10) Patent No.: US 9,108,709 B2
(45) Date of Patent: Aug. 18, 2015

(54) MODULAR OPTRONIC PERISCOPE

(75) Inventor: Thaddeus J. Strzempko, Westfield, MA (US)

(73) Assignee: KOLLMORGEN CORPORATION, Radford, VA (US)

( * ) Notice: Subject to any disclaimer, the term of this patent is extended or adjusted under 35 U.S.C. 154(b) by 482 days.

(21) Appl. No.: 13/164,861

(22) Filed: Jun. 21, 2011

(65) Prior Publication Data
US 2012/0133729 A1   May 31, 2012

Related U.S. Application Data

(60) Provisional application No. 61/356,923, filed on Jun. 21, 2010.

(51) Int. Cl.
H04N 7/00 (2011.01)
B63G 8/38 (2006.01)
G02B 23/08 (2006.01)
H04N 5/225 (2006.01)

(52) U.S. Cl.
CPC *B63G 8/38* (2013.01); *G02B 23/08* (2013.01); *H04N 5/2259* (2013.01)

(58) Field of Classification Search
CPC ......... B63B 8/38; B63B 23/08; H04N 5/2259
See application file for complete search history.

(56) References Cited

U.S. PATENT DOCUMENTS

| 4,020,739 | A  | * | 5/1977  | Piotrowski et al. | 89/41.03 |
| 4,832,449 | A  | * | 5/1989  | Mundy et al. | 359/630 |
| 6,636,199 | B2 | * | 10/2003 | Kobayashi | 345/158 |
| 7,230,881 | B2 | * | 6/2007  | Howard et al. | 367/131 |
| 2004/0046942 | A1 | * | 3/2004 | Katsumata et al. | 353/53 |
| 2004/0056779 | A1 | * | 3/2004 | Rast | 340/985 |
| 2007/0097206 | A1 | * | 5/2007 | Houvener et al. | 348/26 |
| 2009/0321636 | A1 | * | 12/2009 | Ragucci et al. | 250/330 |

* cited by examiner

*Primary Examiner* — Dave Czekaj
*Assistant Examiner* — Md Haque
(74) *Attorney, Agent, or Firm* — Day Pitney LLP

(57) ABSTRACT

A modular optronic periscope includes a staring module, having a plurality of static sensors providing image data for a wide field of view at moderate resolution, and an image processor, by way of which image data from the static sensors are stitched together into a single continuous image. A multi-spectral, narrow field of view at a higher resolution than the staring module is produced using a pointing module including a rotatable mirror, and a collimated optical bundle from the pointing module is imaged by way of an optical platform onto photosensitive devices to form a two dimensional image array. Each pixel of the image array is repositioned by way of image derotation circuitry before display.

7 Claims, 5 Drawing Sheets

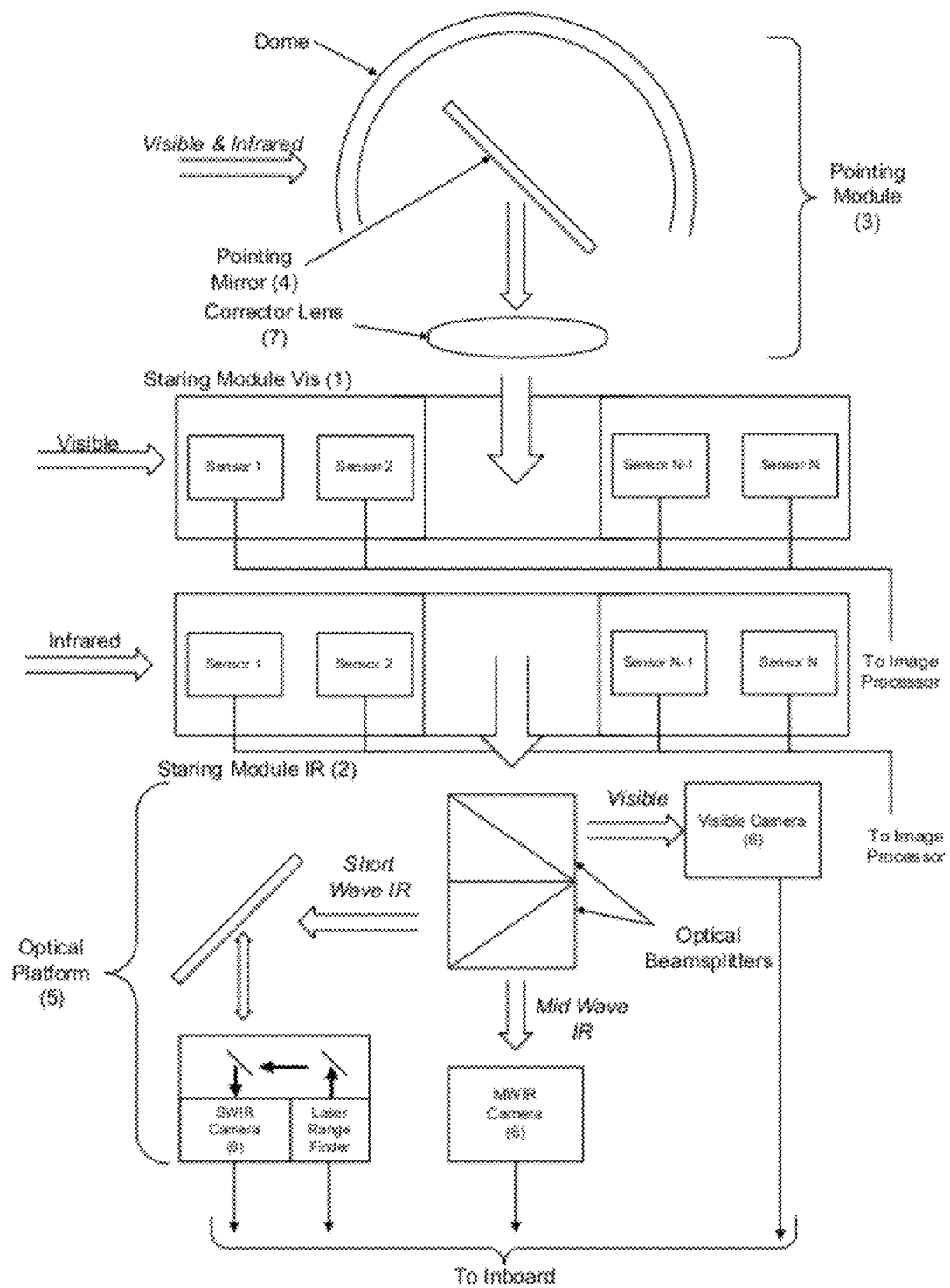
Figure 2A - System Block Diagram

MODULAR OPTRONIC PERISCOPE

CROSS-REFERENCE TO RELATED APPLICATIONS

This application claims priority to U.S. Provisional Patent Application No. 61/356,923, filed on Jun. 21, 2010, the contents of which are hereby incorporated by reference in their entirety.

BACKGROUND OF THE INVENTION

1. Field of the Invention

The present inventions relate to submarine periscopes, particularly those that do not penetrate the submarine hull, but may also be usable with periscopes that do penetrate the submarine hull.

2. Description of Related Art

Conventional periscopes enable a submarine to remain in contact with the above-water environment either visually or by use of electronic sensors. Typical capabilities include imaging (visual and/or other wavelength bands), RF/microwave communications, microwave radar, RF/microwave intercept, GPS, etc. The periscope may penetrate the hull of the submarine, or it may be a non-penetrating design, in which case all sensors are electronic and signals (electrical and/or fiber optic) are relayed to and enter the hull through a specially designed, pressure-proof, hull interface connector. Periscopes are generally designed such that either the entire external pressure boundary rotates (as in a conventional periscope) or some portion of the exterior boundary rotates (optronic periscope) in order to direct the line of sight of its optical subsystems to a desired direction.

The requirement that the pressure vessel rotate imposes several requirements on the design of a periscope in general and an optronic periscope in particular. Principal among these are (a) the need to drive the comparatively high inertia and seal friction of the rotating subassembly with a sufficiently large torque motor, (b) a dynamic high pressure seal that prevents water intrusion into the joint between the rotating and non-rotating elements, and (c) multiple electrical and fiber optic commutation channels that permit efficient and continuous power and signal continuity between the rotating and stationary parts of the system. Moreover, situational awareness may be restricted because the optical line of sight must be physically scanned over the horizon, generally rendering it impossible to observe the entire 360 degree panorama at any given instant of time.

Therefore, the invention disclosed herein provides the following advantages and improvements over current periscope technology:

(a) The elimination of a hydraulic high pressure dynamic seal for higher system reliability and longer life;

(b) A reduction in size, weight and power of mechanisms, hardware and associated electronics required to direct the line of sight. This provides a concurrent improvement in response time for directing the line of sight and an overall improvement in reliability;

(c) the removal of electrical commutation devices that are potential points of failure and that limit the number and type of sensors that can be deployed on a periscope; and (d) improved situational awareness achieved through multi-spectral panoramic imaging in which displayed images are stabilized digitally without moving parts for high reliability.

SUMMARY OF THE INVENTION

It is a primary objective of the invention to eliminate (a) the necessity for large, rotational electro-mechanical subassemblies, (b) the dynamic high pressure seal, and (c) the many electrical and fiber optic commutation channels required in the more conventional embodiment by employing a static outer structure that does not rotate and therefore requires no commutation. A secondary objective is to employ staring cameras together with video processing technology to increase situational awareness while permitting concurrent execution of normal surveillance operations.

According to one embodiment of the invention, a modular optronic periscope includes a staring module that has a plurality of static sensors providing image data for a wide field of view at moderate resolution, and an image processor, by way of which image data from the static sensors are stitched together into a single continuous image. A multi-spectral, narrow field of view at a higher resolution than the staring module is produced using a pointing module that includes a rotatable mirror. An optical bundle from the pointing module is imaged by way of an optical platform onto photosensitive devices to form a two dimensional image array. Each pixel of the image array is repositioned by way of image derotation circuitry before the display, or optical derotation before the sensors. In a preferred embodiment, the optical bundle from the pointing module is a collimated optical bundle. In another preferred arrangement, the collimated optical bundle is separated into smaller spectral wavebands.

The periscope may include a plurality of static sensors that detect visible light, infrared light, or both types of light, and may also include a low inertia rotatable mirror, which, preferably, is inertially stabilized.

BRIEF DESCRIPTION OF THE DRAWINGS

FIG. 2A is a block diagram illustrating the arrangement of various components in the embodiment of FIG. 2.

DETAILED DESCRIPTION OF THE INVENTION

Figure 1:
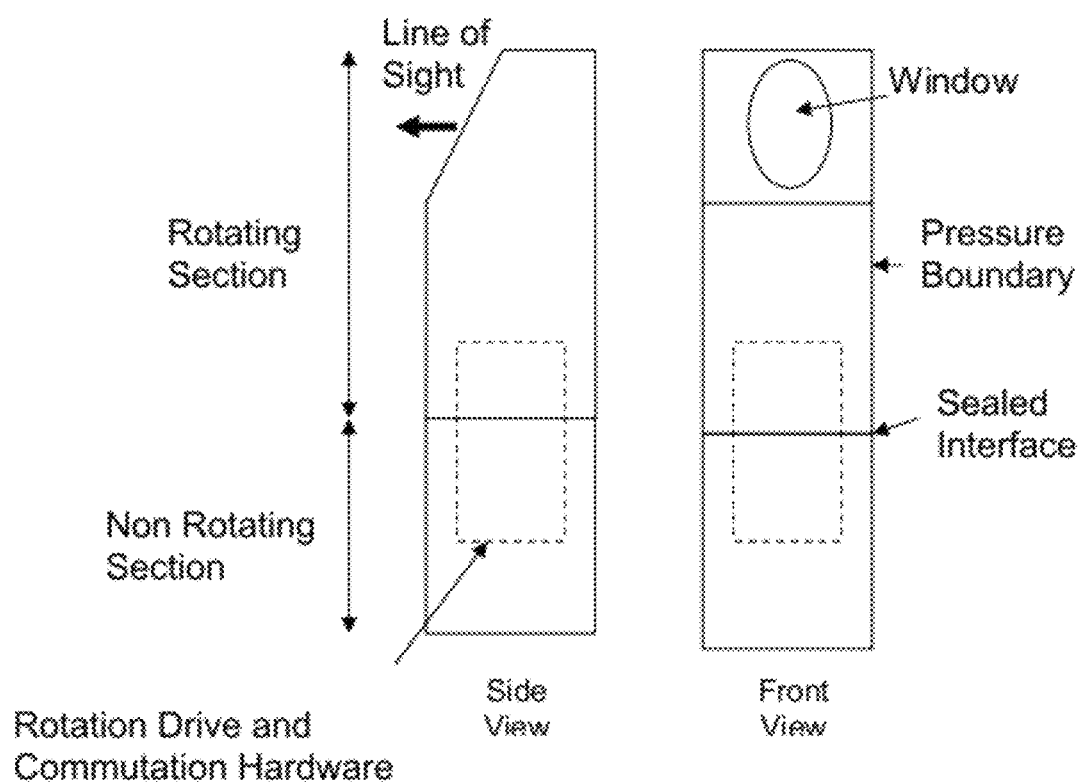
FIG. 1 is a schematic illustration of conventional arrangements in which either an entire external pressure boundary rotates (as in a conventional periscope) or some portion of the exterior boundary rotates (optronic periscope) in order to direct the line of sight of its optical subsystems to a desired direction.
Figure 2:
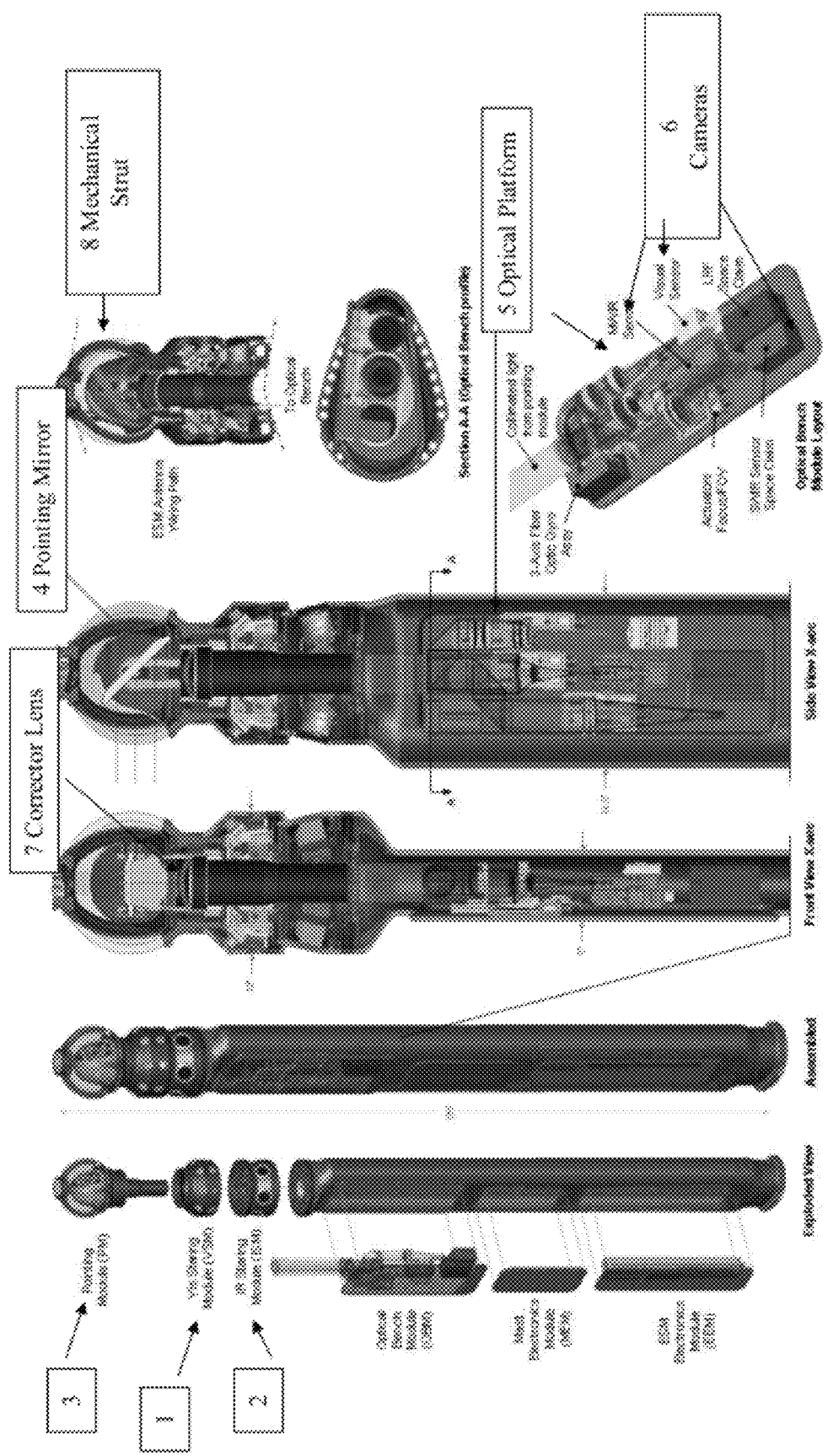
FIG. 2 shows component parts of one embodiment of a modular optronic periscope according to the invention.

Referring to FIGS. 2 and 2A, a Visible Staring Module 1 and a separate Infrared Staring Module 2 provide wide field of regard coverage for situational awareness in the visible and infrared wavebands. These are shown as separate and independent structures that might also be combined into a single assembly. Each module is self-contained and functions independently of the other and also of the Pointing Module described below. These staring modules are static, containing no moving parts, and each covers 360 degrees of azimuth. As such, they require no mechanical line of sight control, no dynamic pressure seals and no electrical commutation. Staring modules that image in other wavebands may be additionally incorporated into the configuration or they may replace one or more of the modules of the embodiment described herein. These Modules are configured with built-in interface connections that enable quick and easy removal and installation.

Each of the Staring Modules 1 and 2 is self contained and pressure-proof, consisting of a pressure-resistant housing that contains a number of imaging sensors each having an optical aperture. The multiple optical apertures are protected from the external environment with windows fabricated of a suitable optical material (such as fused silica, germanium, etc.) as best determined by the wavelength of interest. Material thickness is sufficient to withstand the required hydrostatic pressure. Behind each aperture is an imaging optic and an appropriate imaging sensor (e.g., visible camera, IR camera, etc.). The number of sensors/apertures, their respective optical fields of view, and the pixel count of the imaging sensors are selected so as to provide 360 degrees of azimuth coverage at the desired spatial resolution (instantaneous field of view) measured in pixels per degree. In one embodiment, the sensors may provide a nominal pixel resolution of approximately 0.33 mRad in the visible waveband, although other spatial resolutions may be provided. Each window is sealed to the housing conventional high pressure static sealing methods such as o-rings.

Whereas each sensor in a Staring Module delivers separate image data, such data from the several sensors may be stitched together to form a single continuous image or the data may be electronically sampled so as to display any desired portion of the complete image. Both operations may also be performed concurrently using an image processing technique such as that disclosed in U.S. Patent Application Publication No. 2009/0058988 A1 to Strzempko et al., the entire disclosure of which is incorporated herein by reference as non-essential material. Image motion caused by movement of the submarine platform is removed using image stabilization techniques also disclosed in the Strzempko et al. application referenced above.

Suitable hardware is required to perform the image processing functions outlined above. Additionally, other hardware (such as fiber optic modulators) may also be required to, for example, transmit image data to onboard systems. As determined by the system architecture and by space allowances, this hardware may be located internal to the mast, in locations such as on or near the Optical Platform (described below), or inboard of the submarine hull.

Practical constraints on the number of sensors that may be housed in a Staring Module as well as technical limits on the maximum number of pixels available in a given sensor imposes limits on the maximum achievable spatial resolution. Available pixel densities readily allow low to moderate spatial resolutions to be achieved in the Staring Modules, enabling missions such as situational awareness, safety assessment, and surveillance of objects at relatively close range.

Whereas the Staring Modules 1 and 2 mentioned above are typically configured for low to moderate spatial resolution for accomplishing tasks such as situational awareness and short range surveillance, the Visible/Infrared Pointing Module 3, operating in conjunction with the Optical Platform 5, constitute a narrow field of view, high resolution, multi-spectral optical system that permits surveillance (e.g., detection/recognition) of objects at long range. In a preferred embodiment, the narrow field of view encompasses approximately four degrees or less of azimuth. The high resolution system formed by the Pointing Module and Optical Platform functions independently of the Staring Modules. This allows long range surveillance to be conducted concurrently with situational awareness and short range surveillance.

A stationary dome of the appropriate material and dimensions forms the optical window and pressure barrier for the Pointing Module 3. A large aperture pointing mirror (that may or may not be inertially stabilized) located inside the dome steers the common, multi-spectral line of sight through 360 degrees of azimuth and over the desired elevation range. This mirror is located at the optical center of the dome, and is actuated by azimuth and elevation drive motors (or their equivalents). Because the mirror assembly has relatively low inertia and negligible friction, the driving motors are comparatively small, the required drive power is low and the dynamic response to mirror position commands can be high. The electrical commutation channels that provide power and control signals to the mirror drive elements can be of low current capacity and are few in number, greatly reducing the size and complexity of electrical commutation hardware typically required of current optronic periscope system implementations.

As also shown in FIGS. 2 and 2A, an optical bundle constituting a narrow field of view exits the Visible/Infrared Pointing Module 3 and passes through the center of the Staring Modules 1 and 2 to the Optical Platform 5. As will be understood by those skilled in the art, an optical bundle represents the sum total of all optical ray paths that pass from one plane to another plane along the direction of a given optical axis. In a preferred embodiment, the optical bundle is a collimated optical bundle. As will also be understood, an optical bundle is collimated when optical rays from a point on a distant object are rendered at approximately the same angle with respect to the optical axis. In the Optical Platform 5 the full spectrum, preferably collimated optical bundle is separated into individual smaller spectral wavebands. These separate, collimated wavebands are focused onto their respective sensor arrays using imaging optics optimized for wavelength of operation and optical quality. The sensor arrays may be chosen based on spectral response, pixel count and other desired operating characteristics. Separation of the wavebands can be performed using standard wavelength-sensitive beam splitters, also known as dichroic or thin film filters. The inventive concept disclosed herein does not require that the spectral bands be separated but this would be common practice. Other embodiments might use a combination of beam splitters and reflex mirrors (mirrors that can be switched into or out of the path to redirect an optical bundle) to separate the spectral wavebands and focus the separated wavebands onto suitable sensor arrays.

In a preferred embodiment, three waveband channels are accommodated, although other waveband breaks are possible. The preferred waveband channels are a visible channel, a mid-wave infrared channel, and a short-wave infrared channel. A narrow band laser range finding channel is introduced into the short wave infrared path to allow transmit/receive of laser energy for range finding purposes at a wavelength that can be made safe to the human eye.

The spherical form of the refractive optical dome exhibits optical power, which can contribute objectionable optical aberrations. Therefore, in a preferred embodiment, a Corrector lens 7 located just downstream of the pointing mirror recollimates the incoming beam prior to its being relayed to the imaging optics in the Optical Platform 5.

The optical dome material must exhibit a suitable combination of optical and mechanical properties depending on the system requirements. For multi-spectral applications, it is a requirement that the material have well-behaved optical properties across the spectral wavebands of interest. In addition, for deep submergence applications the material must also exhibit the required structural properties. SPINEL CRYSTAL, a transparent ceramic, is identified as having suitable optical and mechanical properties.

Another material that exhibits the required properties is SAPPHIRE. Other suitable materials may exist now or be available in the future.

It is often necessary and convenient to locate particular electronic sensors and/or devices at the top-most position on a periscope (that is above the Pointing Module 3). Moreover, electrical cables that service these electronic sensors and/or devices may be numerous and must pass through the Pointing Module 3. Mechanical Struts 8 that are either part of a segmented dome structure or that are located inside the dome itself provide the necessary support to permit mounting hardware on top of the dome. These struts also provide a conduit within which the service cables may be housed. The Mechanical Struts 8 are sufficiently narrow so as not to significantly obstruct the optical entrance aperture of the Pointing Module 3. The potentially large numbers of cables that serve the electronic sensors and/or devices do not require commutation because the Pointing Module 3 and the electronic sensors and/or devices located above the Pointing Module 3 do not rotate.

As the Pointing Mirror 4 rotates through 360 degrees in azimuth, the images that are presented to the focal planes of the various Cameras 6 also rotate through 360 degrees. This rotation may be compensated in two possible ways as described below.

Figure 3:
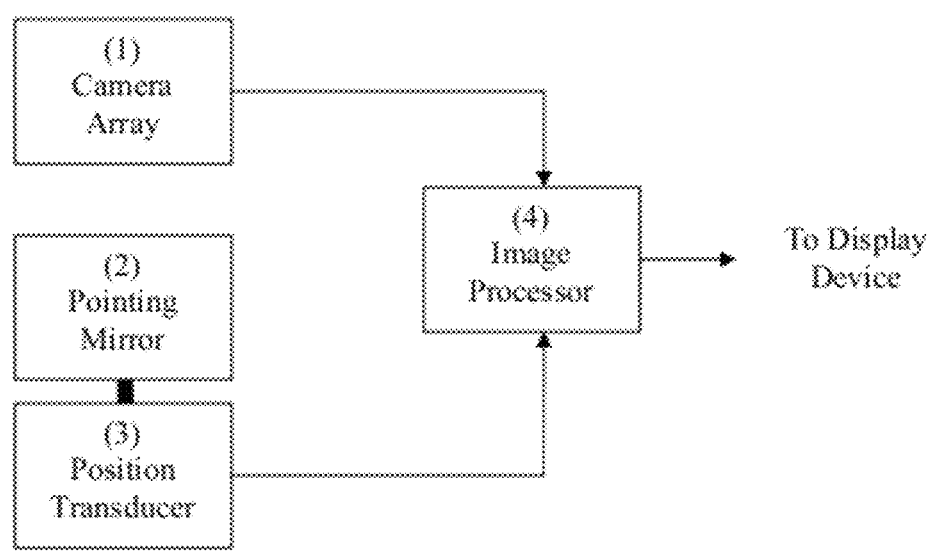
FIG. 3 is a functional block diagram illustrating image derotation through high speed image processing.

In the first method, image derotation is accomplished in the manner schematically represented in FIG. 3. In this embodiment, each pixel (picture element) from the Image or Camera Array 1 is dynamically repositioned by an Image Processor 4 before being displayed. The coordinates of each pixel are dynamically computed as determined by the azimuth position of the Pointing Mirror 2, this position being sensed with an appropriate Position Transducer 3, such as an optical encoder or synchro device. Depending on the size of the image array and the required speed of processing, the Image Processor 4 may be any one of a number of high speed computational devices such as a standard processor, an FPGA (field programmable gate array), a DSP (digital signal processor), a GPU (graphics processing unit) or equivalent. Image Processor 4 may receive image data from the Image or Camera Array 1 as a stream of individual pixels. In one embodiment, the Image Processor 4 can dynamically reposition the image data substantially pixel-by-pixel as individual pixels are received and output the processed (e.g., repositioned) pixels to the display device prior to receiving subsequent pixels of the pixel stream image data from the Image or Camera Array 1. As will be readily understood, this pixel-by-pixel processing minimizes the period of latency between the capture of image data and its display and thus maximizes real-time situational awareness. In another embodiment, Image Processor 4 may dynamically reposition a grouping or neighborhood of pixels of varying size that is substantially less than a full frame and output that group or neighborhood of pixels to the display device prior to receiving subsequent pixels.

Figure 4:
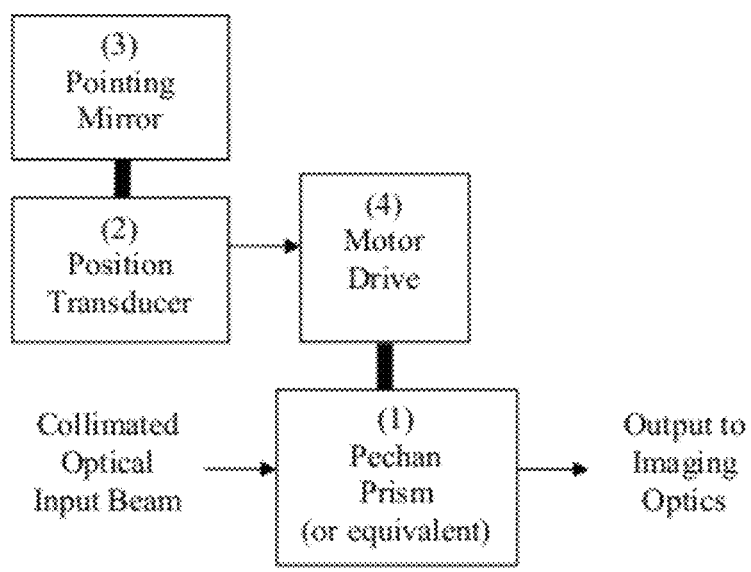
FIG. 4 is a functional block diagram illustrating image derotation using conventional optical hardware.

The second method for achieving image derotation uses conventional optical hardware as schematically depicted in FIG. 4. In this embodiment, an optic, such as a Pechan Prism 1 (or equivalent) placed in the optical path ahead of the cameras, rotates in a direction opposite to the image rotation so as to null out the image rotation. The rotation angle of the image is measured by a Position Transducer 2 that is coupled to the Pointing Mirror 3 as in the previous method. A Drive Motor 4 mechanically coupled to the prism outputs position command signals derived from the Position Transducer 2 to rotate the Prism 1 to the required angle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A modular optronic periscope, comprising:
    a staring module including a plurality of static sensors providing image data for a wide field of view, each static sensor having nominal pixel resolution of at least 0.33 mRad in the visible waveband, said starting module being static while providing panoramic imaging covering 360 degrees of azimuth without moving parts;
    an image processor operable to receive image data from the plurality of static sensors and to stitch together the received image data into a single continuous image;
    a pointing module including a rotatable mirror providing an optical bundle for a multi-spectral narrow field of view of less than four degrees and at a resolution higher than the wide field of view provided by said staring module, said pointing module configured to function independently from said staring module;
    an optical platform operable to image the optical bundle from said pointing module onto photosensitive devices to form a two dimensional image array; and
    image derotation circuitry operable to reposition each pixel of said image array before display.

2. A modular optronic periscope according to claim 1, further comprising a plurality of static sensors that detect visible light.

3. A modular optronic periscope according to claim 1, further comprising a plurality of static sensors that detect infrared light.

4. A modular optronic periscope according to claim 1, further comprising a low inertia rotatable mirror.

5. A modular optronic periscope according to claim 4, wherein said low inertia rotatable mirror is inertially stabilized.

6. A modular optronic periscope according to claim 1, wherein said optical bundle is a collimated optical bundle.

7. A modular optronic periscope according to claim 6, wherein said collimated optical bundle is separated into smaller spectral wavebands.

\* \* \* \* \*